United States Patent
Bloodworth et al.

[11] Patent Number: 6,147,828
[45] Date of Patent: Nov. 14, 2000

[54] METHOD AND APPARATUS FOR REDUCING ASYMMETRY IN A SIGNAL FROM A MAGNETO-RESISTIVE READ HEAD

[75] Inventors: Bryan E. Bloodworth, Irving; Davy H. Choi, Garland; Patrick P. Siniscalchi, Sachse, all of Tex.; Geert A. De Veirman, Irvine, Calif.

[73] Assignee: Texas Instruments Incorporated, Dallas, Tex.

[21] Appl. No.: 09/034,858

[22] Filed: Mar. 4, 1998

[51] Int. Cl.$^7$ .............................. G11B 5/035; G11B 5/02
[52] U.S. Cl. ................................. 360/65; 360/67
[58] Field of Search .................... 360/46, 67, 65

[56] References Cited

U.S. PATENT DOCUMENTS

| | | | |
|---|---|---|---|
| 5,418,660 | 5/1995 | Sato et al. | 360/65 |
| 5,818,655 | 10/1998 | Satoh et al. | 360/65 |
| 5,943,177 | 8/1999 | Mathews et al. | 360/65 |
| 6,005,726 | 12/1999 | Tsunoda | 360/46 |

OTHER PUBLICATIONS

Wilson, et al., "Linearizing the Read Process for Write Nonlinearity Measurements", 3 unnumbered pages, 1997.
Liu, et al., "The Effect of MR Head Nonlinearity on MDFE and PRML Performance", 1997 IEEE, 2 unnumbered pages (1 sheet).
Arnoldussen, et al., "Nonlinear Behavior of Magnetoresistive Heads", 2 unnumbered pages (1 sheet). (Date Unavailable).
Sugawara, et al. "A Nonlinear Model for Magnetic Recording Channel with an MR Head", 2 unnumbered pages (1 sheet). (Date Unavailable).

*Primary Examiner*—W. Chris Kim
*Attorney, Agent, or Firm*—W. Daniel Swayze, Jr.; Wade James Brady, III; Frederick J. Telecky, Jr.

[57] ABSTRACT

A hard disk drive system (10) includes a read/write head (21) for reading and writing data to and from a rotating magnetic disk (12). The read/write head includes a portion which is a magneto-resistive read head (36), the output of which is supplied through a preamplifier (26) to a read channel circuit (27). The read head has a nonlinear transfer function. The read channel circuit includes an asymmetry compensation circuit (62), which generates an analog compensation signal by squaring an output signal from the read head and scaling by an asymmetry factor ($\alpha'$). The analog compensation signal is combined with the analog output signal in order to obtain a corrected analog signal, which is substantially free of the distortion introduced by the read head.

13 Claims, 8 Drawing Sheets

6,147,828

METHOD AND APPARATUS FOR REDUCING ASYMMETRY IN A SIGNAL FROM A MAGNETO-RESISTIVE READ HEAD

TECHNICAL FIELD OF THE INVENTION

This invention relates in general to circuit for processing the output of a read head of a hard disk drive system and, more particularly, to a method and apparatus for causing such a circuit to reduce distortion in an analog output signal from a magneto-resistive read head.

BACKGROUND OF THE INVENTION

Hard disk drive systems include a rotating magnetic disk, and a read/write head which is supported adjacent the disk for movement approximately radially of the disk. The read/write head includes a portion which is a write head and which magnetically records data on the disk, and a portion which is a read head and which reads information from the disk. The analog output signal from the read head is supplied through a preamplifier to a read channel circuit, which processes the output signal from the read head.

One technique for increasing the density of information stored on a given hard disk is to use a magneto-resistive (MR) read head. The MR read head is used in conjunction with a write head which is linear, and which thus stores data on the disk without introducing nonlinear distortion. In contrast, the MR read head has a nonlinear transfer function, which is approximated by the $\cos^2$ function, and which can introduce distortion into the signal it reads from the disk. The amount of distortion depends in part on the degree of nonlinearity, which varies from head to head. In addition, the nonlinearity of the signal can be affected by system parameters, such as head flying height, disk material, disk rotational speed, head shape, and ambient temperature. The added distortion may cause errors when supplied to existing read channel circuits, and such errors can significantly degrade the read channel performance. Although it is known to use an automatic gain control circuit to normalize variations in a linear portion of the transfer function, nonlinear portions of the transfer function introduce distortion which cannot be corrected by an automatic gain control circuit.

One known approach for dealing with this problem is to purchase a greater quantity of MR read heads than is needed for production, and to then test each read head and discard those with the greatest degree of nonlinearity. Thus, the resulting subset of read heads, which are eventually installed in the actual products, have a limited degree of distortion and thus produce a reduced number of read channel errors. However, although this approach reduces errors, it does not always eliminate them. Moreover, discarding a large percentage of the purchased read heads is inefficient and expensive, and thus increases the cost of the resulting hard disk drive systems.

Another known approach is to provide a nonlinear analog-to-digital converter in the read channel circuit. The analog-to-digital converter is specifically designed with a nonlinear characteristic which is the inverse of the MR read head nonlinearity, and which compensates for the distortion introduced by the MR read head. However, analog-to-digital converters are complex and take up a good deal of area in an integrated circuit, thus increasing the overall cost and power consumption of the integrated circuit. Further, the distorted signal cannot be applied to the analog-to-digital converter until after it has been processed by an automatic gain control circuit and a low pass filter, thus degrading their performance. For similar reasons, a nonlinear analog-to-digital converter cannot be incorporated into the preamplifier which precedes the read channel circuit. Moreover, although a nonlinear analog-to-digital converter can be used in a read channel which relies on digital detection, it cannot be used in a read channel which relies on analog detection.

SUMMARY OF THE INVENTION

From the foregoing, it may be appreciated that a need has arisen for a method and apparatus for causing a circuit to reduce distortion present in an analog output signal from an MR read head, while achieving circuit performance comparable to that obtained with a circuit associated with a linear read head. This includes a suitable bandwidth and signal-to-noise ratio for the circuit. The circuit should be capable of effecting dual polarity asymmetry correction, and should be gain independent, process independent, and temperature independent. According to the present invention, a method and apparatus are provided to address this need, and involve processing an analog output signal from a read head having a nonlinear transfer function, in order to generate a corrected analog signal by adjusting the analog output signal so as to reduce a nonlinearity introduced by the read head.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
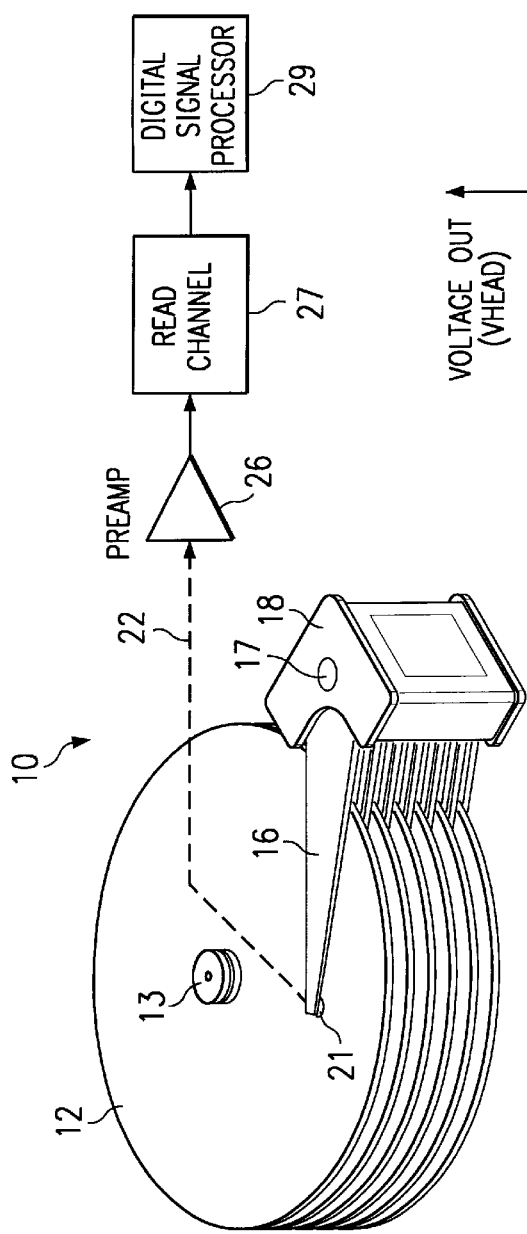
FIG. 1 is a diagrammatic view of a portion of a hard disk drive system which embodies the present invention.

FIG. 1 is a diagrammatic view of part of a hard disk drive system 10 which embodies the present invention. The system 10 includes a plurality of magnetic disks 12 which are fixedly secured to a spindle 13 that is rotationally driven by a not-illustrated spindle motor. A plurality of arms 16 are supported for pivotal movement about an axis defined by a pivot axle 17, pivotal movement of the arms 16 being effected under control of a voice coil motor 18. At the outer end of each arm is a read/write head 21. The head 21 includes respective portions which serve as a read head and a write head.

As shown diagrammatically at 22, the output of the read head is coupled to an input of a preamplifier 26. The output of the preamplifier 26 is coupled to an input of a read channel circuit 27, the output of which is coupled to an input of a digital signal processor 29. The read channel 27 and digital signal processor 29 may both be implemented in a single integrated circuit.

As mentioned above, the read/write head 21 includes a portion which serves as a write head. The write head stores information on the rotating disk 12. The write head in the disclosed embodiment has a substantially linear transfer function, so that information supplied to the write head is magnetically recorded on the disk with little or no distortion.

The read/write head 21 also includes a portion which serves as a read head. In the disclosed embodiment, the read head is a magneto-resistive (MR) read head. The use of an MR read head facilitates use of the disk 12 to store more information than could be stored on the disk with certain other types of heads. However, the MR read head has a nonlinear $\cos^2$ characteristic which can add distortion to a signal read from the disk. One purpose of the present invention is to reduce the distortion introduced by the MR read head, and thus avoid errors in the read channel circuit 27.

Figure 2:
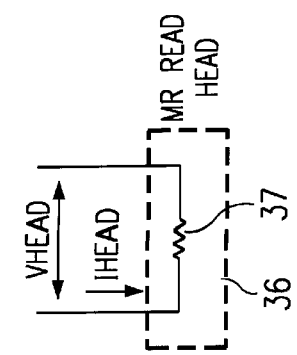
FIG. 2 is a diagrammatic view of a magneto-resistive read head which is a component of the system of FIG. 1.

FIG. 2 is a diagrammatic representation of an MR read head, which is a portion of the read/write head 21 of FIG. 1, and which is designated by reference numeral 36. The MR read head 36 includes a resistive element 37, the resistance of which varies in response to an applied magnetic field from the magnetic disk 12. A predetermined bias current IHEAD is caused to flow through the resistive element 37. Since V=IR, and since the current IHEAD is constant, changes in resistance caused by an applied magnetic field will cause the voltage VHEAD across the resistive element 37 to vary.

Figure 3:
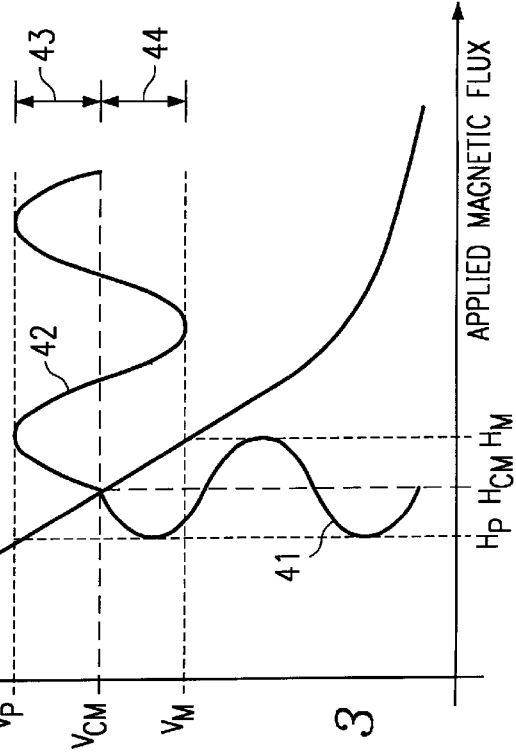
FIG. 3 is a graph showing a transfer function of the read head of FIG. 2 and a first set of operational conditions.

More specifically, FIG. 3 is a graph depicting the transfer function 38 of the MR read head 36 of FIG. 2. The horizontal axis represents the magnetic flux applied to the head 36 by the magnetic disk 12 as the disk moves past the head, and the vertical axis represents the resulting voltage (VHEAD) out of the head. FIG. 3 shows that the voltage out varies between values of $V_P$ and $V_M$ as the magnetic flux varies between values of $H_P$ and $H_M$. In FIG. 3, the magnitude of the bias current IHEAD (FIG. 2) for the MR head 36 is such that the head is operating in a linear region of the nonlinear transfer function 38, relative to the magnitude of the applied magnetic field. Thus, in response to the application to the head of an ideal sinusoidal input, as shown diagrammatically at 41, the head will reproduce the sinusoid with little or no distortion, as shown diagrammatically at 42. In particular, it will be noted that the positive amplitude 43 of the output signal is substantially identical to the negative amplitude 44.

Figure 4:
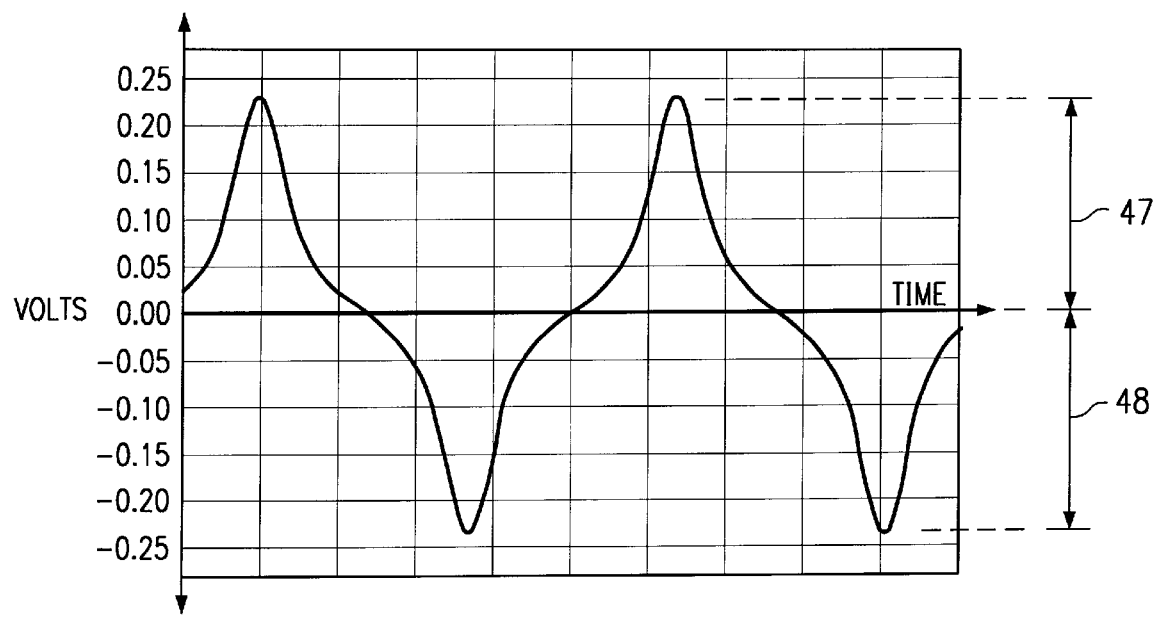
FIG. 4 is a graph showing an output signal of the read head of FIG. 2 which corresponds to the first set of operational conditions.

In reality, the magnetic flux from the rotating disk 12 is not an ideal sinusoidal signal. FIG. 4 depicts an actual output signal produced by the MR head 36 in response to an applied magnetic flux, when the head is operating in a linear region of the transfer function 38, as shown in FIG. 3. It will be noted that there is little or no distortion or asymmetry in the amplitude of the signal, in that the magnitude of the positive amplitude 47 is substantially equal to the magnitude of the negative amplitude 48.

However, it is difficult to ensure that the MR read head 36 is always operating in a linear region of the transfer function 38. As one example, the magnitude of the magnetic flux will depend on the distance between the read head and the disk, which is known as the flying height of the head. The flying height will, in turn, depend on the rotational speed of the portion of the disk adjacent the head. The speed of the disk portion which is adjacent and moving past the head is greater when the head is aligned with a radially outer portion of the disk than when the head is aligned with a radially inner portion of the disk. Thus, the head may have a greater flying height for radially outer portions of the disk than for radially inner portions.

Figure 5:
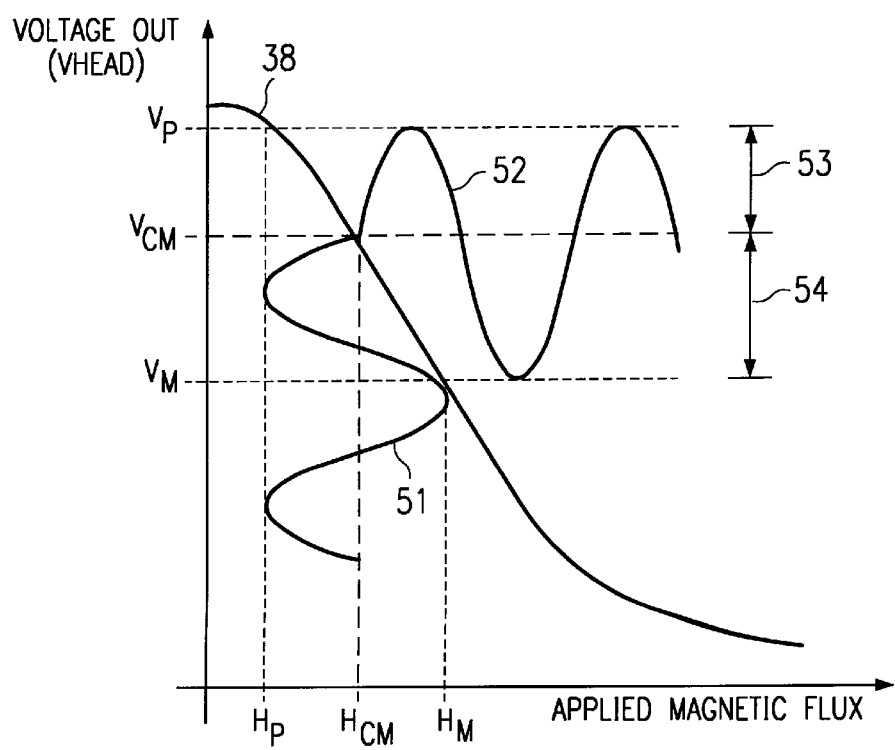
FIG. 5 is a graph similar to FIG. 3 and shows the same transfer function, but shows a second set of operational conditions different from the first set.

FIG. 5 is a graph similar to FIG. 3, and shows the same transfer function 38. However, FIG. 5 shows on the horizontal axis that the values of applied magnetic flux are lower than those shown in FIG. 3, for example because the flying height of the head is greater. When the head is further from the disk, a given magnetic field on the disk will appear weaker to the head than if the head were closer to the disk. In FIG. 5, it will be noted that some values of the magnetic field correspond to a nonlinear portion of the transfer function 38 (near the left end of the transfer function curve). Thus, if the applied magnetic flux followed an ideal sinusoid, as represented diagrammatically at 51, the output signal from the head would be a distorted sinusoid, as shown diagrammatically at 52. That is, although the input sinusoid 51 has equal positive and negative amplitudes, the distorted sinusoid 52 has a positive amplitude 53 which is less than its negative amplitude 54.

Figure 6:
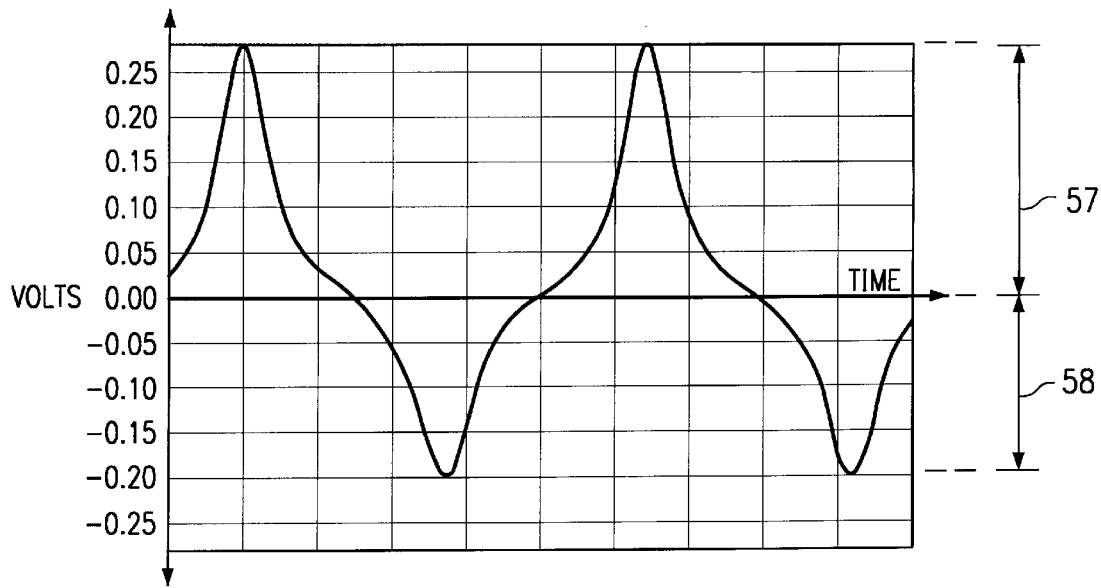
FIG. 6 is a graph similar to FIG. 4, but showing a different output signal corresponding to the second set of operational conditions.

As mentioned above, the applied magnetic flux is not actually a sinusoidal signal. FIG. 6 is a graph showing an actual distorted output signal from the MR read head 36, where the positive amplitude 57 is greater than the negative amplitude 58. The signals graphically depicted in FIG. 4 and 6 are of a type commonly known as Lorentzian signals.

The transfer function 38 (FIG. 3) can be well characterized by the expression $(x(t)+\alpha x(t)^2)$, where $x(t)$ is the input signal representing the varying magnetic flux, and $\alpha$ is an asymmetry factor. The actual shape of the transfer function varies from head to head, even within a given production lot. First, the slope in the linear region may vary. Second, the nonlinear characteristic represented by the asymmetry factor $\alpha$ may vary. To the extent that the slope in the linear region varies, it can be corrected by using an automatic gain control (AGC) circuit to normalize the gain of the head. To the extent that the asymmetry factor a also varies from head to head, it cannot be corrected by an AGC circuit.

Figure 7:
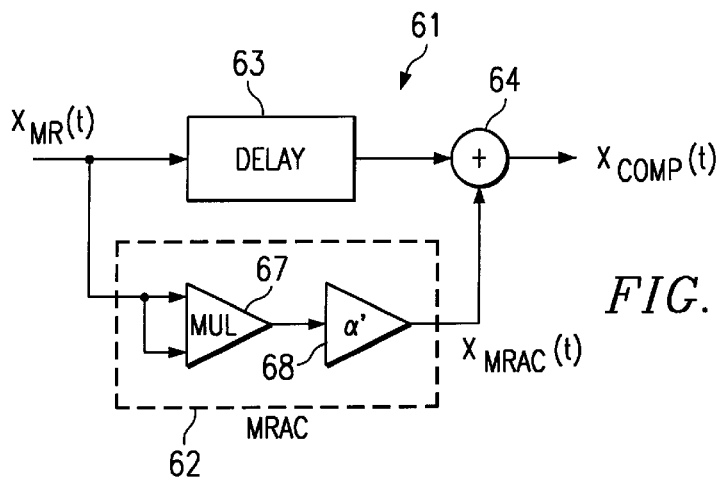
FIG. 7 is a block diagram of an ideal correction circuit that embodies the present invention.

In order to compensate for the asymmetry introduced by the head 36, the disclosed embodiment is provided with a nonlinear correction circuit. FIG. 7 is a block diagram of an ideal nonlinear correction circuit 61, which is intended to substantially reduce or eliminate the distortion or nonlinearity that may be introduced by the MR read head 36.

In FIG. 7, the distorted analog output signal $x_{MR}(t)$ from the MR head is applied to an input of a delay circuit 63, and also to an input of a magneto-resistive asymmetry correction (MRAC) circuit 62. The MRAC circuit 62 generates a correction or compensation signal $x_{MRAC}(t)$. The delay circuit 63 simply delays the input signal $x_{MR}(t)$ by an interval equal to the propagation delay through the MRAC circuit 62, in order maintain alignment in time. A summing junction 64 combines the delayed input signal from the delay circuit 63 with the correction or compensation signal from the MRAC circuit 62, and outputs a corrected or compensated signal $x_{COMP}(t)$.

The MRAC circuit 62 includes a multiplier 67, which squares the input signal $x_{MR}(t)$, by multiplying the input signal by itself. The squared input signal is then scaled by an amplifier 68 having a gain $\alpha'$, the output of the amplifier 68 being the correction or compensation signal $x_{MRAC}(t)$. The following equations are representative of the circuit of FIG. 7:

$$x_{MR}(t) = x(t) + \alpha x(t)^2 \qquad (1)$$

$$x_{MRAC}(t) = \alpha'(x(t)^2 + 2\alpha x(t)^3 + \alpha^2 x(t)^4) \qquad (2)$$

$$x_{COMP}(t) = x_{MR}(t) - x_{MRAC}(t) = x(t) + \alpha x(t)^2 - \alpha'(x(t)^2 + 2\alpha x(t)^3 + \alpha^2 x(t)^4) \qquad (3)$$

$$x_{COMP}(t) \approx x(t) \text{ (for } \alpha \approx \alpha') \qquad (4)$$

where $x(t)$ represents the varying magnetic flux applied to the read head, and $\alpha$ is the asymmetry factor of the particular magnetic head. It will be noted that, in order for the circuit to operate accurately, the correct value $\alpha'$ must be chosen, so as to match the asymmetry factor $\alpha$ specific to that particular read head. Otherwise, the third and fourth order terms in equation (3) will cause distortion if $\alpha$ is too large. The third and fourth order terms in equation (3) are high frequency harmonics, which can be removed by a low pass filter, but it is desirable to configure the correction circuit so that these terms are minimized or eliminated by the correction circuit itself. It will be noted that $\alpha'$ may be set to either a positive or negative value, in order to correct for positive asymmetry or negative asymmetry.

Figure 8:
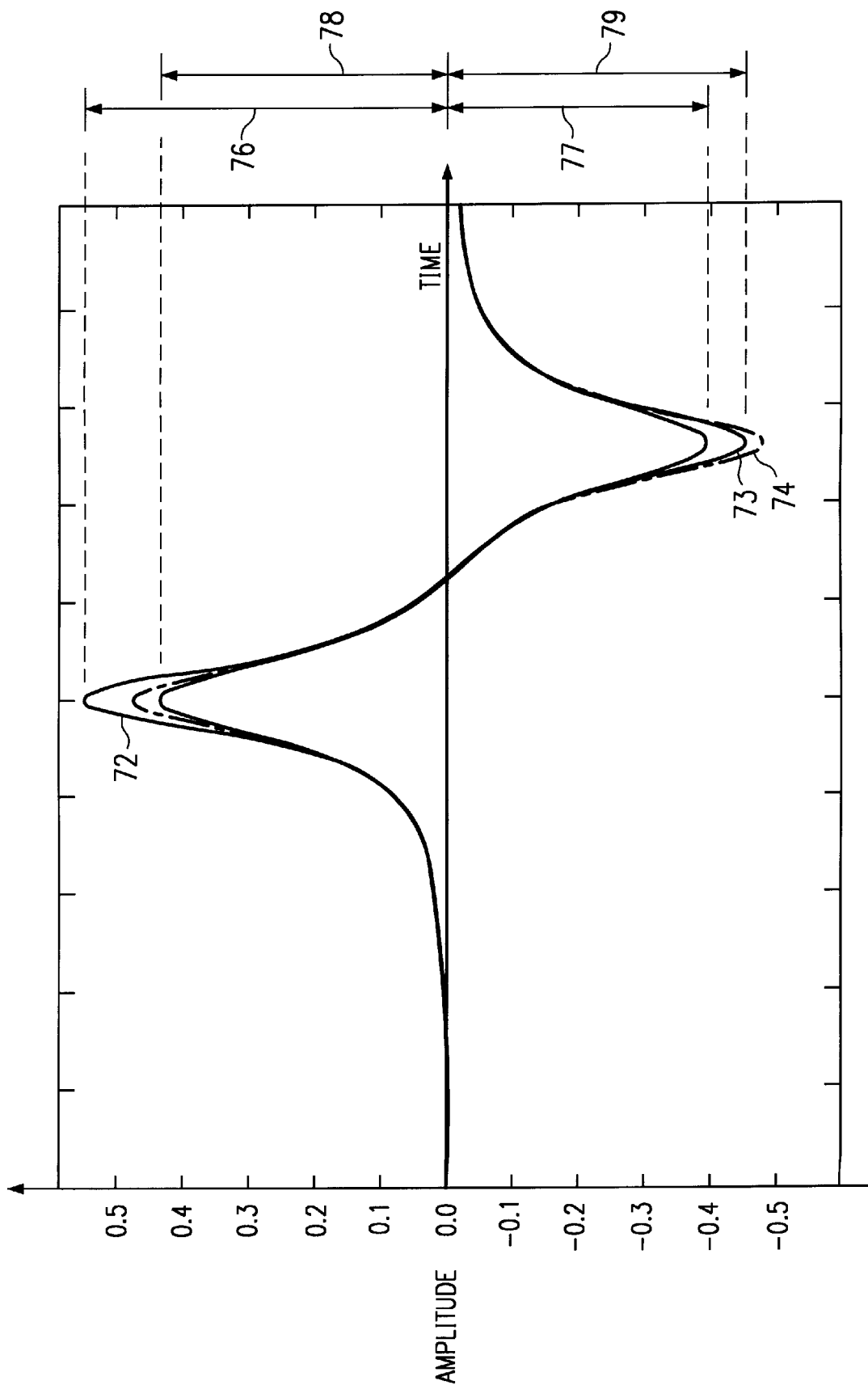
FIG. 8 is a graph showing input and output signals for the correction circuit of FIG. 7.

FIG. 8 is a graph showing an input Lorentzian signal 72 having a one-volt peak-to-peak differential, and having a 37.5% signal asymmetry, where signal asymmetry is defined to be:

((positive peak voltage/negative peak voltage)-1).

The corrected signal out of the correction circuit 61 (FIG. 7) is shown at 73 in FIG. 8. It will be noted that the asymmetric input signal has a positive amplitude 76 which is 40% greater than its negative amplitude 77, and it will be noted that the corrected signal 73 has positive and negative amplitudes 78 and 79 which are substantially equal. An ideal Lorentzian output signal is shown at 74, and it will be noted that the correction signal 73 conforms closely to the ideal signal 74. In fact, the magnitude difference between the signals 73 and 74 can be eliminated by the same AGC circuit provided to normalize variations from head to head of the slope of the linear portion of the transfer function. It will be recognized that, after such AGC normalization, the circuit of FIG. 7 effects an almost ideal correction for the asymmetry.

The value of $\alpha$ for a given MR head may vary slightly with age and temperature, but for all practical purposes is effectively constant for a given MR head. Thus, the value of $\alpha'$ can also effectively be a constant for a given circuit associated with a particular head. On the other hand, as discussed above, the value of $\alpha$ does vary somewhat from head to head, for example due to manufacturing process variations. Consequently, in order to utilize the circuit of FIG. 7 in a production situation, it must be possible to trim the value of $\alpha'$ so that it is matched to the value of $\alpha$ for the specific MR head which is selected for use in that hard disk drive.

Figure 9:
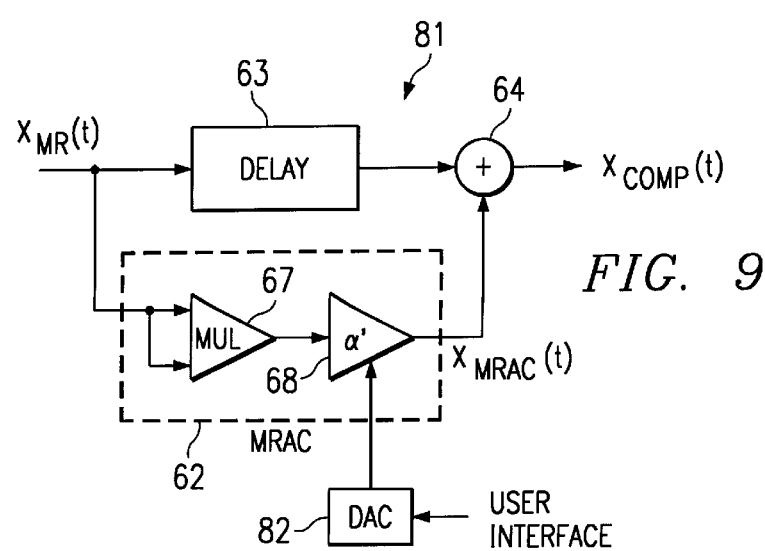
FIG. 9 is a block diagram of a correction circuit which is an alternative embodiment of the correction circuit of FIG. 7.

In this regard, FIG. 9 is a diagrammatic view of a correction circuit 81, which is identical to the correction circuit 61 of FIG. 7, except that it includes a digital-to-analog converter (DAC) circuit 82, which can be used to trim the particular value of $\alpha'$. The digital inputs to the DAC 82 are provided through a user interface, but could alternatively be set for a particular circuit through the provision of fusible links at the digital inputs to the DAC, or by other corrective circuitry. The user interface may be implemented by the digital signal processor 29 (FIG. 1), or through it.

Figure 10:
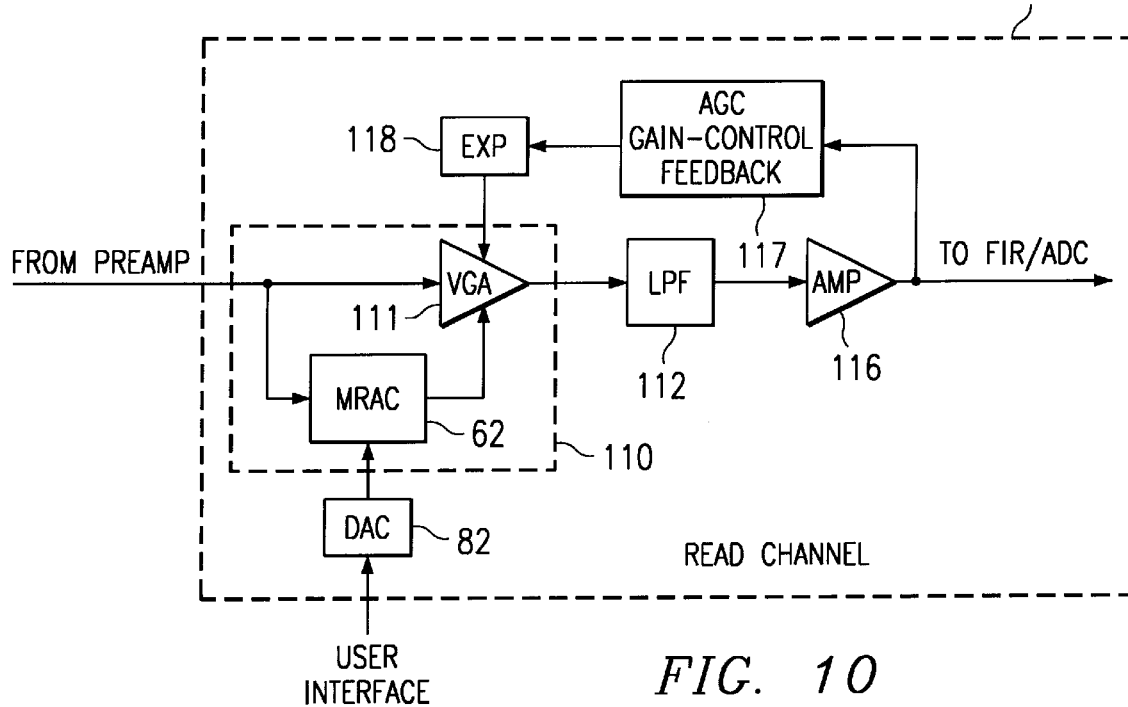
FIG. 10 is a block diagram of a read channel circuit which is a component of the system of FIG. 1 and which embodies the present invention.

FIG. 10 is a block diagram of the read channel circuit 27 of FIG. 1. The read channel circuit 27 includes a correction circuit 110, which implements the correction technique discussed above in association with FIGS. 7–9. In particular, the correction circuit 100 includes the MRAC circuit 62, and a variable gain amplifier (VGA) 111. The circuitry within the correction circuit 110 is described in more detail later. The read channel circuit 27 also includes the DAC 82, which supplies to the MRAC 62 a signal representing a selected value of $\alpha'$. The read channel circuit 27 further includes a low pass filter (LPF) 112, which has an input coupled to an output of the VGA 111. An amplifier 116 has an input coupled to the output of the LPF 112, and has an output which is coupled to other circuitry within the read channel circuit 27, such as a not-illustrated analog-to-digital converter (ADC) circuit and finite impulse response (FIR) filter.

An AGC gain-control feedback circuit 117 has an input coupled to the output of the amplifier 116. An exponential voltage to current converter circuit 118 has an input coupled to the output of the feedback circuit 117, and has an output which controls the gain of the VGA 111. The configuration of the correction circuit 110 provides an advantageous tradeoff between noise and bandwidth. The output of the MRAC circuit 62 can be summed at one of the summing nodes in the VGA 111, thus avoiding the need to provide an extra series summing circuit, and thereby saving power and preserving bandwidth. The noise performance can be adjusted in dependence on which summing node is picked within the VGA 111.

Figure 11:
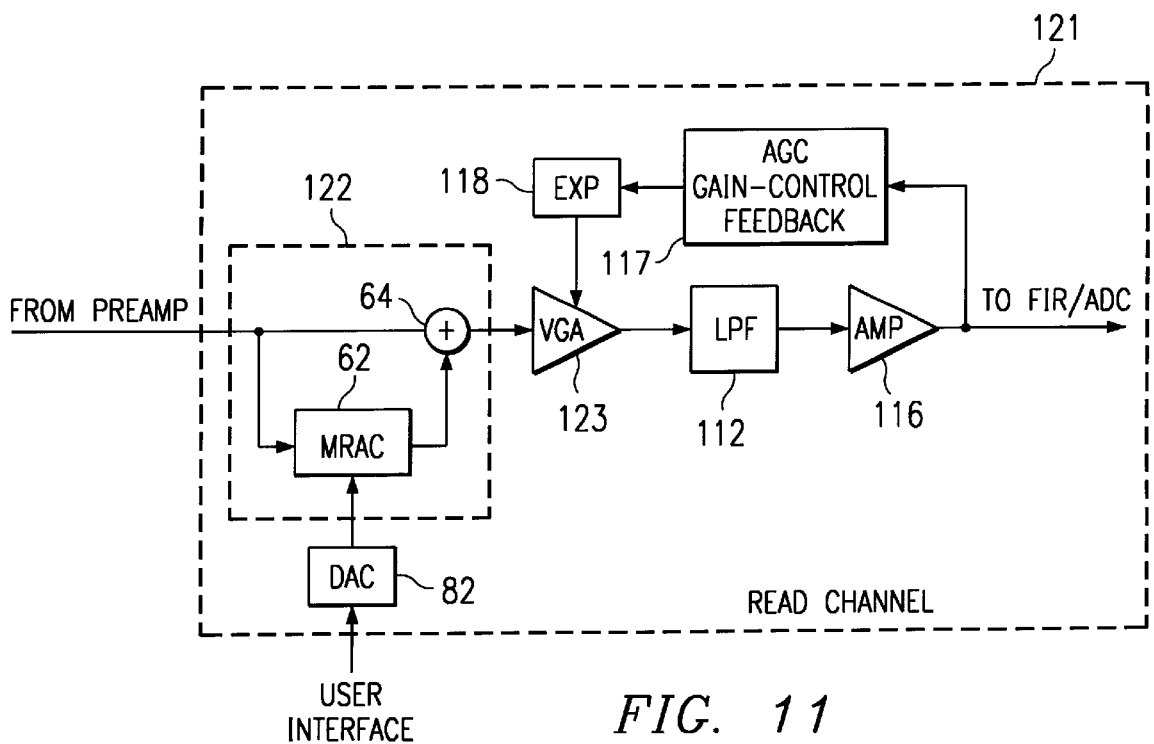
FIG. 11 is a block diagram of a read channel circuit which is an alternative embodiment of the read channel circuit of FIG. 10.

FIG. 11 is a block diagram of a read channel circuit 121, which is an alternative embodiment of the read channel circuit 27 shown in FIG. 10. In FIG. 11, a correction circuit 122 and a VGA 123 are functionally separate components, the correction circuit 122 being coupled between an output from the preamplifier and an input to the VGA 123. The correction circuit 122 corresponds to the correction circuit described above in association with FIG. 9, except that the delay element 63 has been omitted. If the MRAC circuit 62 is designed to have a minimal propagational delay relative to the period of output signals from the MR read head 36, the delay circuit may optionally be omitted, as shown in FIG. 11. However, the delay circuit could alternatively be present in the correction circuit 122 of FIG. 11.

The embodiment of FIG. 11 will have a lower signal-to-noise ratio than the embodiment of FIG. 10, because the VGA 123 will amplify all noise inherently introduced by the correction circuit 122. Further, providing the correction circuit 122 in series with the VGA 123 will reduce the overall bandwidth in comparison to the embodiment of FIG. 10. Nevertheless, the read channel circuit 121 of FIG. 11 provides significantly better performance than a read channel which completely lacks asymmetry correction.

Figure 12:
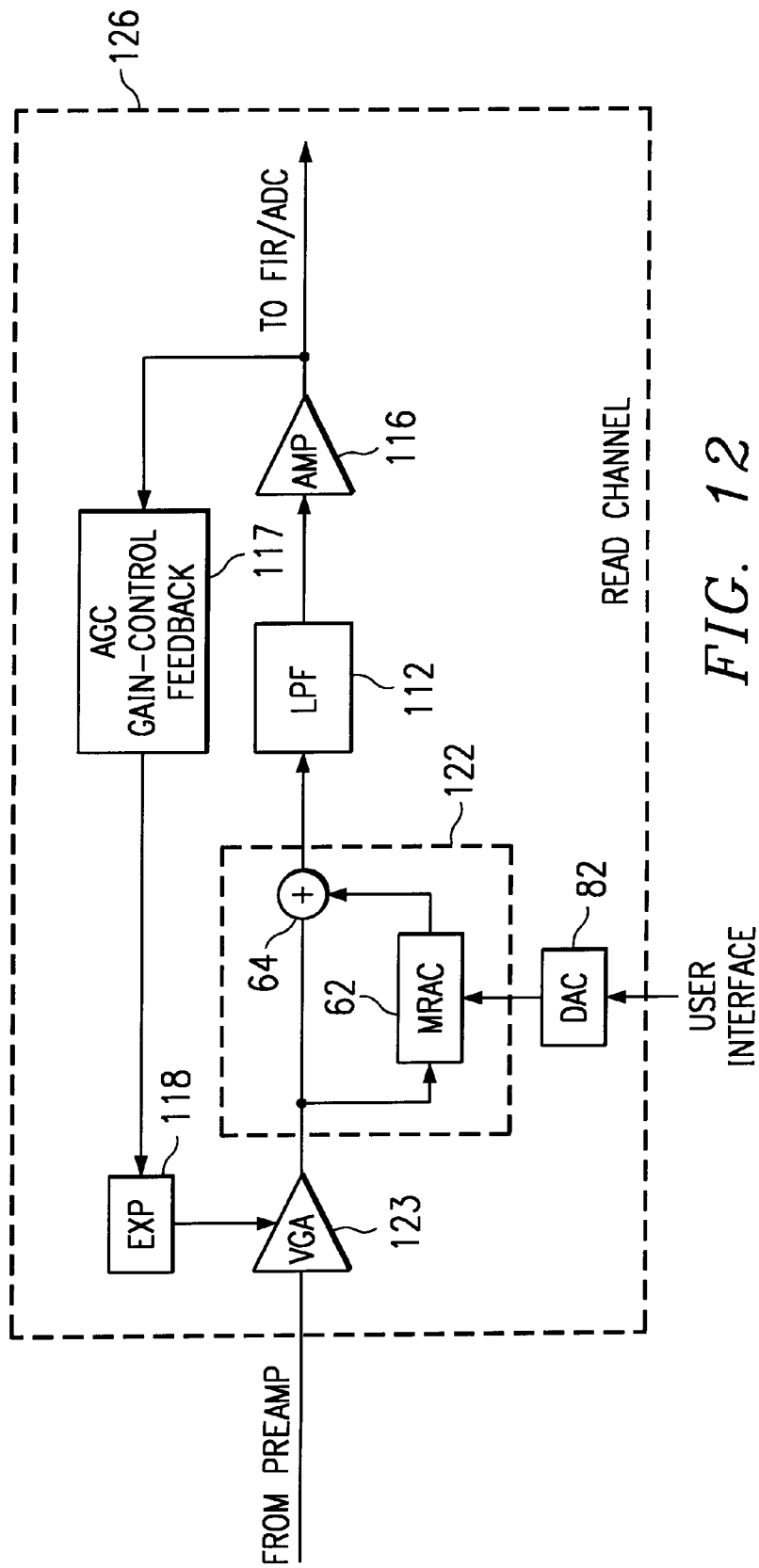
FIG. 12 is a block diagram of a read channel circuit which is still another alternative embodiment of the read channel circuit of FIG. 10.

FIG. 12 is a block diagram of a read channel circuit 126, which embodies the present invention and which is yet another alternative embodiment of the read channel circuit 27 of FIG. 10. The read channel circuit 126 is generally similar to the read channel circuit 121 of FIG. 11, except that the correction circuit 122 is provided between the output of the VGA 123 and the input to the LPF 112, rather than between the preamplifier and the VGA 123. Providing the correction circuit 122 between the VGA 123 and the LPF 112 yields a very high signal-to-noise ratio, but also provides a reduced bandwidth in comparison to the embodiment of FIG. 10. The embodiment of FIG. 12 is thus advantageous for applications where reduced bandwidth is considered acceptable in order to achieve a better signal-to-noise ratio.

Figure 13:
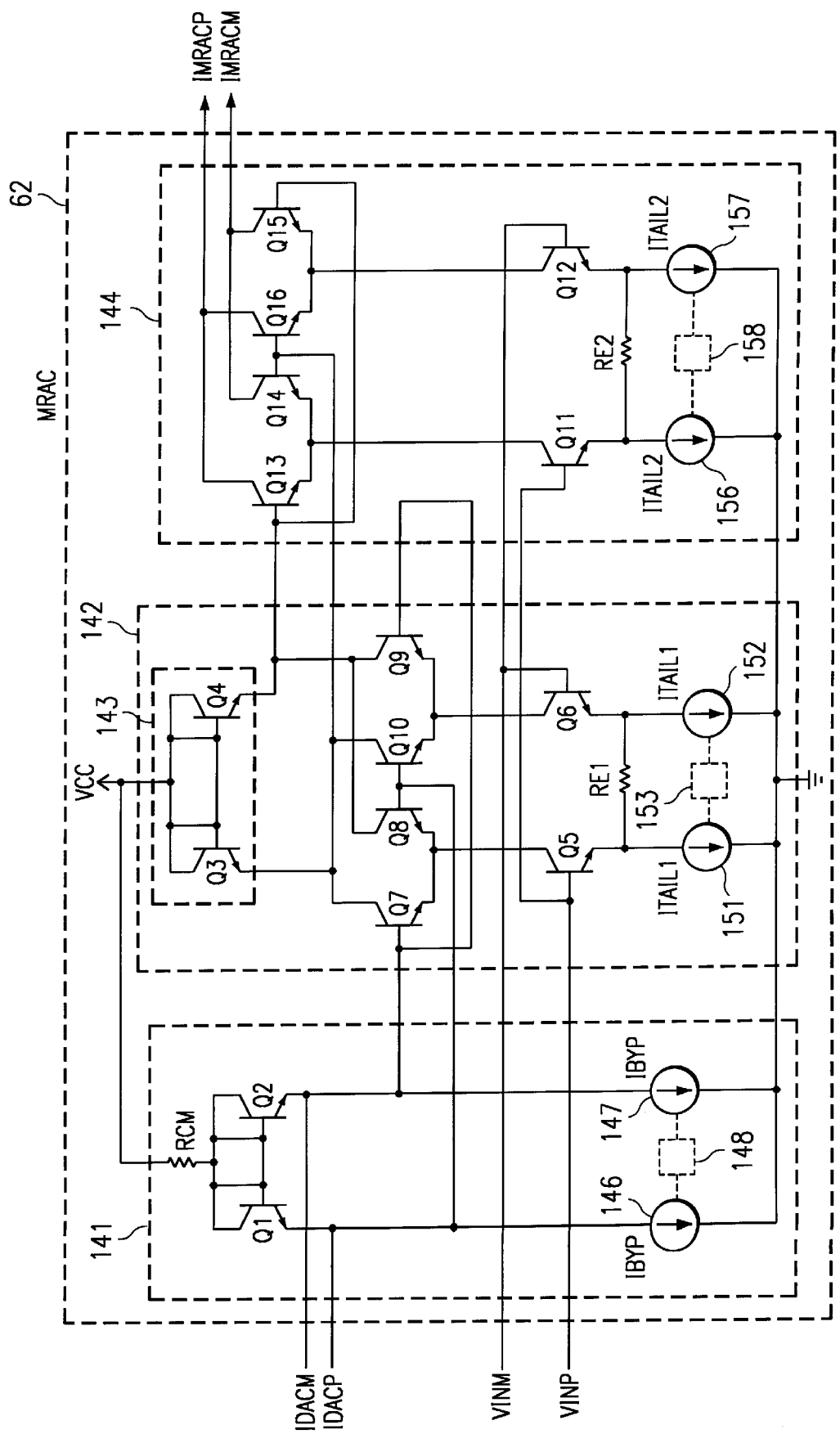
FIG. 13 is a schematic diagram of an asymmetry compensation circuit which is a component of a correction circuit in the read channel circuit of FIG. 10.

The specific circuitry within the correction circuit 110 of FIG. 10 will now be described. FIG. 13 is a schematic diagram of the circuitry of the MRAC circuit 62 of FIG. 10. As shown in FIG. 13, the MRAC circuit 62 includes a differential current input which is defined by signals IDACP and IDACM, and which is the signal from the DAC 82 representing the scaling factor α'. A differential voltage input is defined by a pair of voltage signals VINP and VINM, and represents the distorted or asymmetric input signal received from the preamplifier 26 (FIG. 1). The MRAC circuit 62 also produces a differential current output which is defined by signals IMRACP and IMRACM, and which is the correction signal supplied from the MRAC circuit 62 to the VGA 111.

Turning now to the specific circuitry within the MRAC circuit 62, circuit 62 includes a predistortion stage 141, a multiplier circuit 142 having a further predistortion stage 143, and a further multiplier circuit 144. In the disclosed embodiment, the multiplier circuits 142 and 144 are each a circuit of the type commonly known as a Gilbert cell. The predistortion stage 141 introduces intentional distortion into the differential signal representing α', in order to compensate for inherent distortion within the multiplier 142. The multiplier 142 multiplies the distorted signal for α' by the output signal from the preamplifier. The predistortion stage 143 then intentionally distorts the product of this multiplication, in order to compensate for distortion inherent in the multiplier 144. The multiplier 144 multiplies this predistorted product by the output signal from the preamplifier, in order to output the desired correction signal, which is set forth above in equation (2). As discussed above, the third and fourth order terms in equation (2) will be negligible if α' has been selected to be substantially equal to the value of α for the particular MR head.

The predistortion stage 141 includes a current source 146 and a current source 147, as well as a mirror circuit 148 which is coupled to each of the current sources 146 and 147. The mirror circuit 148 forms a current mirror with the current source 146, and also forms a separate current mirror with the current source 147. As a result, the current sources 146 and 147 each conduct the same amount of current IBYP. The multiplier 142 includes a similar arrangement of two current sources 151 and 152, and a mirror circuit 153. The multiplier circuit 144 also includes a similar arrangement of current sources 156 and 157, and a mirror circuit 158.

Figure 14:
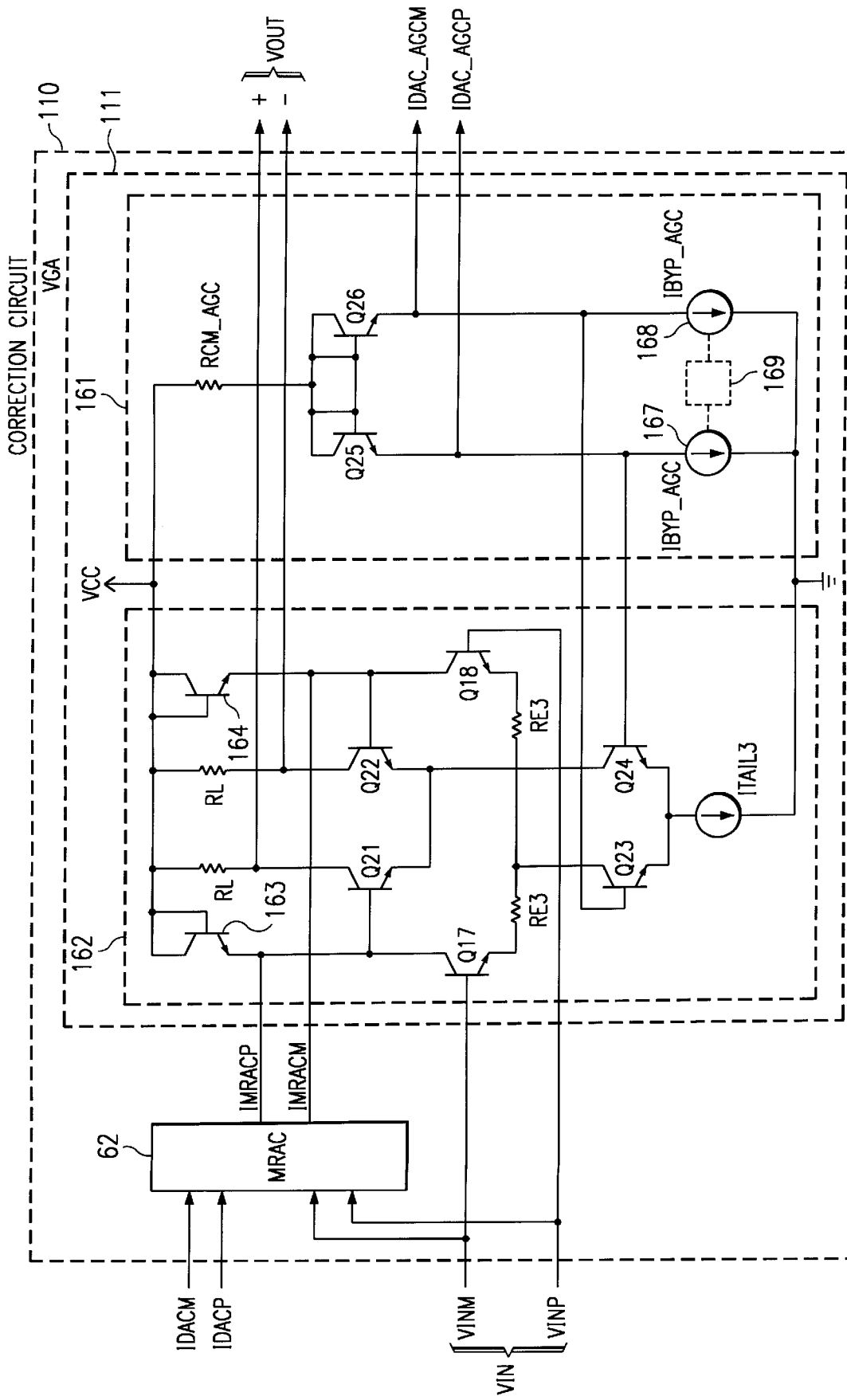
FIG. 14 is a schematic block diagram of the correction circuit from the embodiment of FIG. 10, showing in detail the circuitry of a variable gain amplifier which is a component of the correction circuit.

FIG. 14 is a block diagram of the entire correction circuit 110 of FIG. 10, including the MRAC circuit 62 and the VGA 111. FIG. 14 includes a schematic diagram for the VGA 111. The VGA 111 receives the correction signal output from the MRAC circuit 62, in the form of the differential pair of current signals IMRACP and IMRACM. The VGA 111 also receives the distorted input signal VIN from the preamplifier, in the form of the differential signal pair VINP and VINM. Further, the VGA 111 receives the gain control signal from the exponential converter circuit 118, in the form of differential current signals IDAC_AGCM and IDAC_AGCP. The VGA 111 produces an output voltage VOUT in the form of a differential voltage, the output VOUT being supplied to the low pass filter (LPF) 112 in FIG. 10.

Internally, the VGA circuit 111 includes a predistortion stage 161 and a multiplier 162, the multiplier 162 including two transistors 163 and 164 which together serve as a predistortion stage. The predistortion stage 161 is similar to the predistortion stage 141 shown in FIG. 13, and has two current sources 167 and 168 in association with a mirror circuit 169. The predistortion stage 161 effects intentional predistortion of the gain control signal from the exponential converter circuit 118, in order to compensate for distortion inherent in the multiplier 162. Similarly, the transistors 163 and 164 effect predistortion of the output signal from the MRAC circuit 62 and also the input signal VIN received through transistors Q17 and Q18, in order to compensate for distortion introduced by the transistors Q21 and Q22 of the multiplier 162. The multiplier 162 multiplies the predistorted input signal from the preamplifier with the predistorted gain signal from the predistortion stage 161, and subtracts from the product the compensation signal received from the MRAC circuit 62, in order to obtain the corrected output signal VOUT.

As discussed above, the correction circuit 110 provides an excellent tradeoff between noise and bandwidth characteristics. Further, by combining the MRAC circuit 62 and the VGA circuit 111 in the correction circuit 110, the overall circuit is gain independent, in the sense that any gain change implemented by the AGC feedback at 117 and 118 (FIG. 10) is automatically effected for the entire correction circuit 110 by the VGA 111, without any need to provide a separate gain correction within the MRAC circuit 62. Also, the output of the MRAC circuit 62 is introduced into the circuitry of the VGA 111 at a relatively high frequency node, which ensures that the MRAC circuit 62 does not significantly slow down the operation of the VGA 111. In addition, the specific circuitry shown in FIGS. 13 and 14 can effect both positive and negative asymmetry correction.

Moreover, the overall correction circuit 110 of FIG. 14 is process and temperature independent. To demonstrate this, the output signal VOUT from the correction circuit 110 can be represented by the following equation:

$$VOUT = \frac{RL}{RE3}\left(\frac{IBYP\_AGC + IAGC}{IBYP\_AGC - IAGC}\right)^2 \quad (5)$$

$$\left(VIN - \left(\frac{4RE3}{ITAIL1 \cdot RE1 \cdot RE2}\right)\left(\frac{IDAC}{IBYP}\right)VIN^2\right)$$

In Equation (5), process and temperature variations in the resistance RL in a numerator are canceled by equivalent variations in the resistance RE3 in the associated denominator. Temperature and process variations affecting the current IBYP_AGC are canceled by its appearance in both a numerator and the associated denominator. Process and temperature variations affecting the resistance RE3 in a numerator are canceled by similar changes in the resistance RE2 in the associated denominator. Process and temperature variations which affect the current IDAC in a numerator will effect a proportional change in the current IBYP in the associated denominator.

Process and temperature variations of the resistance RE1 in a denominator will be canceled by variations in the current ITALI1 in the same denominator, because the current ITALI1 is generated in inverse proportion to a resistance which will be equally affected by the process and temperature variations. Thus, since equation (6) is process and temperature independent, and since it defines the output voltage VOUT of the correction circuit 110 of FIG. 14, the output voltage VOUT is process and temperature independent.

The present invention provides numerous technical advantages. One such technical advantage is that the invention can be incorporated into a read channel circuit in order to reduce errors and improve performance, while providing a suitable bandwidth and signal-to-noise ratio. A further advantage is that the circuit according to the invention can provide dual polarity correction, or in other words the correction of positive or negative asymmetry. Still another advantage is the provision of an asymmetry correction circuit which is process independent, temperature independent, and gain independent.

Although one embodiment has been illustrated and described in detail, it should be understood that various changes, substitutions and alterations can be made therein without departing from the scope of the present invention. For example, the disclosed embodiment uses a correction signal obtained by scaling the square of an input signal, but it will be recognized that there are other correction signals which fall within the scope of the present invention. Further, the present application discloses different ways to incorporate the invention into a read channel circuit, but it will be recognized that there are still other ways to incorporate asymmetry correction into a read channel circuit in accord with the present invention. Moreover, the present invention discloses particular circuitry for one embodiment of a correction circuit, which integrates an asymmetry compensation circuit with a variable gain amplifier, but it will be recognized that there are other circuit arrangements which could alternatively be used to realize the present invention.

It should also be recognized that direct connections disclosed herein could be altered, such that two disclosed components or elements would be coupled to one another through an intermediate device or devices without being directly connected, while still realizing the present invention. Other changes, substitutions and alterations, including the rearrangement or reversal of parts, are also possible without departing from the spirit and scope of the present invention, as defined by the following claims.

What is claimed is:

1. A circuit for processing an analog output signal from a read head having a nonlinear transfer function, said circuit comprising:

a nonlinearity correction circuit which has an input coupled to receive the analog output signal and which is operative to generate a corrected analog signal by adjusting the analog output signal to reduce a nonlinearity introduced by the read head; said nonlinearity correction circuit including an asymmetry compensation circuit which has an input coupled to receive the analog output signal and which is operative to generate an analog compensation signal representative of the nonlinearity introduced by the read head, and including circuitry operative to combine the analog compensation signal with the analog output signal to obtain the corrected analog signal;

wherein said asymmetry compensation circuit includes a variable gain amplifier having an input responsive to the analog output signal and having a gain determined by a gain signal; wherein said circuitry operative to combine is a portion of said variable gain amplifier.

2. A circuit according to claim 1, including a low pass filter having an input coupled to said output of said variable gain amplifier.

3. A circuit according to claim 1, wherein said variable gain amplifier includes a first predistortion circuit operative to predistort the gain signal to compensate for a first distortion characteristic, a second predistortion circuit which is operative to predistort the analog compensation signal to compensate for a second distortion characteristic, circuitry for combining the analog output signal and the predistorted analog compensation signal from said second predistortion circuit, and a multiplier for multiplying the predistorted gain signal from said first predistortion circuit by the combined analog output signal and predistorted analog compensation signal, said multiplier having an output which carries the corrected analog signal.

4. A method for processing an analog output signal from a read head having a nonlinear transfer function, comprising the step of generating a corrected analog signal by adjusting the analog output signal to reduce a nonlinearity introduced by the read head;

wherein said generating step includes the steps of developing an analog compensation signal by squaring and scaling the analog output signal, and combining the analog output signal and the analog compensation signal to obtain the corrected analog signal.

5. A circuit for processing an analog output signal from a read head having a nonlinear transfer function, said circuit comprising:

a nonlinearity correction circuit which has an input coupled to receive the analog output signal and which is operative to generate a corrected analog signal by adjusting the analog output signal to reduce a nonlinearity introduced by the read head;

wherein said nonlinearity correction circuit includes an asymmetry compensation circuit which has an input coupled to receive the analog output signal and which is operative to generate an analog compensation signal representative of the nonlinearity introduced by the read head, and includes a variable gain amplifier having an input coupled to receive the analog output signal, having a gain determined by a gain signal, having an output which serves as the corrected analog signal, and having a circuit portion which combines the analog compensation signal with the analog output signal to obtain the corrected analog signal.

6. A circuit according to claim 5, wherein said nonlinearity correction circuit is implemented in an integrated circuit, and is process independent, temperature independent, and gain independent.

7. A circuit according to claim 5, wherein said nonlinearity correction circuit is an analog circuit.

8. A circuit for processing an analog output signal from a read head having a nonlinear transfer function, said circuit comprising:

a nonlinearity correction circuit which has an input coupled to receive the analog output signal and which is operative to generate a corrected analog signal by adjusting the analog output signal to reduce a nonlinearity introduced by the read head; said nonlinearity correction circuit including an asymmetry compensation circuit which has an input coupled to receive the analog output signal and which is operative to generate an analog compensation signal representative of the nonlinearity introduced by the read head, and including circuitry operative to combine the analog compensation signal with the analog output signal to obtain the corrected analog signal;

wherein said asymmetry compensation circuit generates the analog compensation signal as the square of the analog output signal multiplied by an asymmetry factor.

9. A circuit for processing an analog output signal from a read head having a nonlinear transfer function, said circuit comprising:

a nonlinearity correction circuit which has an input coupled to receive the analog output signal and which is operative to generate a corrected analog signal by adjusting the analog output signal to reduce a nonlinearity introduced by the read head; said nonlinearity correction circuit including an asymmetry compensation circuit which has an input coupled to receive the analog output signal and which is operative to generate an analog compensation signal representative of the nonlinearity introduced by the read head, and including circuitry operative to combine the analog compensation signal with the analog output signal to obtain the corrected analog signal;

wherein said asymmetry compensation circuit generates the analog compensation signal as the square of the analog output signal multiplied by an asymmetry factor; and including a low pass filter having an input to which the corrected analog signal is applied, said low pass filter having an output which is coupled to an output of said circuit.

10. A circuit for processing an analog output signal from a read head having a nonlinear transfer function, said circuit comprising:

a nonlinearity correction circuit which has an input coupled to receive the analog output signal and which is operative to generate a corrected analog signal by adjusting the analog output signal to reduce a nonlinearity introduced by the read head; said nonlinearity correction circuit including an asymmetry compensation circuit which has an input coupled to receive the analog output signal and which is operative to generate an analog compensation signal representative of the nonlinearity introduced by the read head, and including circuitry operative to combine the analog compensation signal with the analog output signal to obtain the corrected analog signal;

wherein said asymmetry compensation circuit generates the analog compensation signal as the square of the analog output signal multiplied by an asymmetry factor; and including an asymmetry setting circuit which supplies to said asymmetry compensation circuit a signal defining the asymmetry factor.

11. A circuit for processing an analog output signal from a read head having a nonlinear transfer function, said circuit comprising:

a nonlinearity correction circuit which has an input coupled to receive the analog output signal and which is operative to generate a corrected analog signal by adjusting the analog output signal to reduce a nonlinearity introduced by the read head; said nonlinearity correction circuit including an asymmetry compensation circuit which has an input coupled to receive the analog output signal and which is operative to generate an analog compensation signal representative of the nonlinearity introduced by the read head, and including circuitry operative to combine the analog compensation signal with the analog output signal to obtain the corrected analog signal;

wherein said asymmetry compensation circuit generates the analog compensation signal as the square of the analog output signal multiplied by an asymmetry factor;

including an asymmetry setting circuit which supplies to said asymmetry compensation circuit an asymmetry factor signal defining the asymmetry factor; and wherein said asymmetry compensation circuit includes a first predistortion circuit operative to preadjust the asymmetry factor signal to compensate for a first distortion characteristic, a first multiplier which has the first distortion characteristic and which is operative to multiply the predistorted asymmetry factor signal from said first predistortion circuit by the analog output signal, a second predistortion circuit which is operative to preadjust the output of said first multiplier to compensate for a second distortion characteristic, and a second multiplier which has the second distortion characteristic and which is operative to multiply the output of said second distortion circuit by the analog output signal.

12. A circuit according to claim 11, wherein said first and second multipliers each include a Gilbert cell multiplier circuit.

13. A circuit according to claim 8, wherein said nonlinearity correction circuit is implemented in an integrated circuit, and is process independent, temperature independent, and gain independent.

* * * * *